(12) United States Patent
Belikov et al.

(10) Patent No.: US 7,501,939 B1
(45) Date of Patent: Mar. 10, 2009

(54) DISPLAY DEVICE WITH DIMMABLE SEGMENTS

(75) Inventors: Sergey Belikov, Canton, MI (US);
Sergio A Paulo, Windsor, CA (US);
Osamu Yamada, Novi, MI (US)

(73) Assignee: Yazaki North America, Inc., Canton, MI (US)

( * ) Notice: Subject to any disclaimer, the term of this patent is extended or adjusted under 35 U.S.C. 154(b) by 179 days.

(21) Appl. No.: 11/201,076

(22) Filed: Aug. 10, 2005

(51) Int. Cl.
*B60Q 1/00* (2006.01)

(52) U.S. Cl. .................. 340/438; 340/688; 340/441

(58) Field of Classification Search .............. 340/438, 340/688
See application file for complete search history.

(56) References Cited

U.S. PATENT DOCUMENTS

| | | | |
|---|---|---|---|
| 1,532,548 A | | 4/1925 | Ramsey |
| 3,882,490 A | | 5/1975 | Tashiro et al. |
| 5,583,484 A | * | 12/1996 | Asano ..................... 340/461 |
| 5,741,058 A | | 4/1998 | Suzuki et al. |
| 5,781,872 A | | 7/1998 | Konishi et al. |
| 5,815,072 A | * | 9/1998 | Yamanaka et al. .......... 340/461 |
| 5,949,330 A | | 9/1999 | Hoffman et al. |
| 5,949,346 A | | 9/1999 | Suzuki et al. |
| 5,998,928 A | * | 12/1999 | Hipp ..................... 315/77 |
| 6,118,385 A | * | 9/2000 | Leard et al. ............. 340/688 |
| 6,181,301 B1 | * | 1/2001 | Inoguchi et al. .......... 345/5 |
| 6,333,697 B1 | | 12/2001 | Kumazawa et al. |
| 6,337,672 B1 | | 1/2002 | Inoguchi et al. |
| 6,461,006 B1 | * | 10/2002 | Matumoto ............... 362/27 |
| 6,575,607 B1 | | 6/2003 | Klemish et al. |
| 6,674,416 B2 | * | 1/2004 | Kamei et al. ............ 345/39 |
| 6,674,497 B2 | | 1/2004 | Brandt |
| 6,714,126 B2 | * | 3/2004 | Wada ................... 340/438 |
| 6,778,095 B2 | * | 8/2004 | Lo ..................... 340/815.78 |
| 6,867,757 B1 | * | 3/2005 | Nakamura .............. 345/83 |
| 6,922,139 B2 | * | 7/2005 | Vågstedt ................ 340/438 |
| 6,951,399 B2 | * | 10/2005 | Tamura ................. 362/23 |
| 7,048,397 B2 | * | 5/2006 | Birman ................. 362/26 |
| 7,113,077 B2 | * | 9/2006 | Masters et al. .......... 340/425.5 |
| 7,126,564 B2 | * | 10/2006 | Schach et al. ........... 345/75.1 |
| 7,248,175 B2 | * | 7/2007 | Wu ..................... 340/815.4 |
| 2005/0174226 A1 | * | 8/2005 | Heyden et al. .......... 340/461 |

* cited by examiner

*Primary Examiner*—Toan N. Pham
*Assistant Examiner*—Kerri L. McNally
(74) *Attorney, Agent, or Firm*—Harness, Dickey & Pierce, P.L.C.

(57) ABSTRACT

The present invention generally includes a display device having a plurality of indicia indicative of a vehicle parameter. The display device includes a plurality of dimmable segments. Each dimmable segment has a lower end point associated with a first value of the vehicle parameter and an upper end point associated with a second value of the vehicle parameter. Each of the dimmable segments has an independently adjustable intensity and adapted to illuminate at least a portion of the indicia. A control module is adapted to receive a signal indicative of an actual value of the vehicle parameter. The control module also adjusts the intensity of at least one of the dimmable segments based on the signal. The intensity being at a first intensity when the actual value is about equal to the first value, the intensity being at a second intensity when the actual value is about equal to the second value, and the intensity being at an intensity between the first intensity and the second intensity when the actual value is between the respective first value and the respective second value.

21 Claims, 7 Drawing Sheets

DISPLAY DEVICE WITH DIMMABLE SEGMENTS

FIELD OF THE INVENTION

The present invention relates to a display device and more specifically to dimmable segments in an instrument cluster reflexive of a vehicle parameter.

BACKGROUND OF THE INVENTION

Typical instrument clusters may have one or more illumination devices that light the front and/or back of the instrument cluster. Typically, the illumination device may be dimmed causing the entire instrument cluster to change lighting intensity. Moreover, other instrument clusters may change, flash or coordinate lights when the vehicle is turned on which may be referred to as a wowing affect. In other instances, individual segments on the instrument cluster may be lit or extinguished as increments in vehicle speed change. For example, when one vehicle speed is reached one segment is lit; as an additional increment in vehicle speed is reached, an additional segment is lit.

Figure 1:
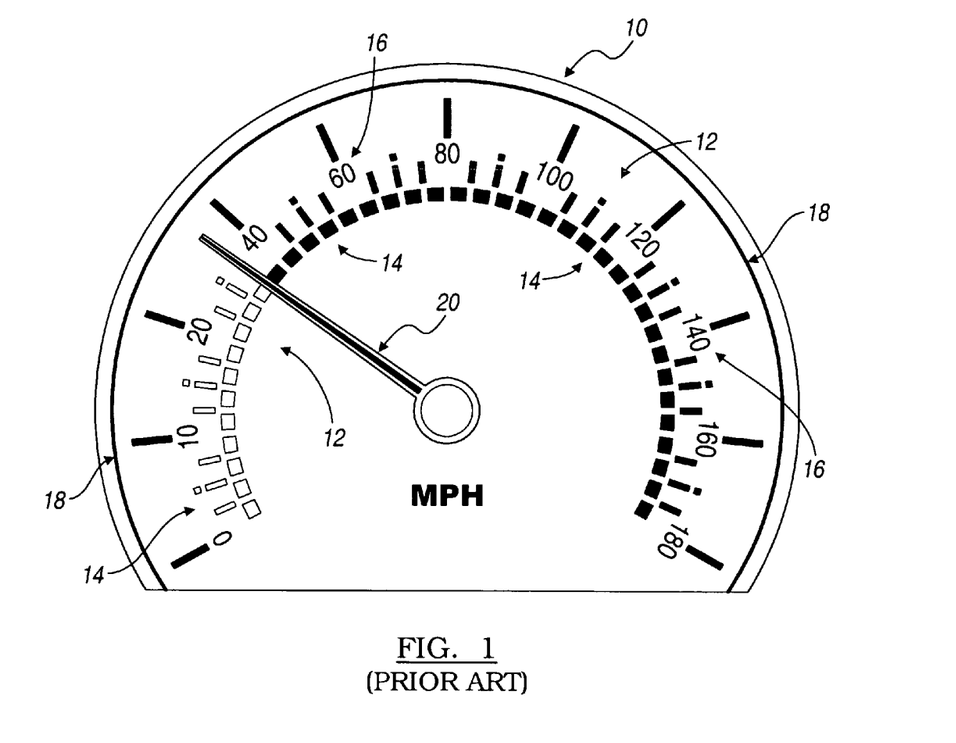
FIG. 1 is a prior art front view of an exemplary speedometer.

With reference to FIG. 1, a typical speedometer 10 is shown. The speedometer 10 may include a plurality of indicia 12, which may include tick marks 14, characters 16 and/or a border 18. Each of the indicia 12 may be lit by an illumination device behind said indicia 12. A rotatable pointer 20 may rotate about the speedometer 10 and point selectively to the indicia 12 to indicate a current vehicle speed. As the pointer 20 rotates beyond a certain value (e.g., about 35 miles an hour), the indicia 12, which are associated with a speed fewer than 35 miles an hour, remain lit. The indicia 12, which are associated with a speed greater than 35 miles an hour, remain dark. As the pointer 20 travels over each indicia 12, the indicia 12 change from being dark to being lit. In this arrangement, the illumination of the indicia 12 appears choppy relative to the smooth travel of the pointer 20.

SUMMARY OF THE INVENTION

The present invention generally includes a display device having a plurality of indicia indicative of a vehicle parameter. The display device includes a plurality of dimmable segments. Each dimmable segment has a lower end point associated with a first value of the vehicle parameter and an upper end point associated with a second value of the vehicle parameter. Each of the dimmable segments has an independently adjustable intensity and adapted to illuminate at least a portion of the indicia. A control module is adapted to receive a signal indicative of an actual value of the vehicle parameter. The control module also adjusts the intensity of at least one of the dimmable segments based on the signal. The intensity being at a first intensity when the actual value is about equal to the first value, the intensity being at a second intensity when the actual value is about equal to the second value, and the intensity being at an intensity between the first intensity and the second intensity when the actual value is between the respective first value and the respective second value.

Further areas of applicability of the present invention will become apparent from the detailed description and the claims provided hereinafter. It should be understood that the detailed description and specific examples, while indicating the various embodiments of the present invention, are intended for purposes of illustration only and are not intended to limit the scope of the invention.

BRIEF DESCRIPTION OF THE DRAWINGS

The present invention will become more fully understood from the detailed description, the appended claims and the accompanying drawings, wherein:

DETAILED DESCRIPTION OF THE VARIOUS EMBODIMENTS

The following description of the various embodiments is merely exemplary in nature and is in no way intended to limit the invention, its application, or uses.

Figure 2:
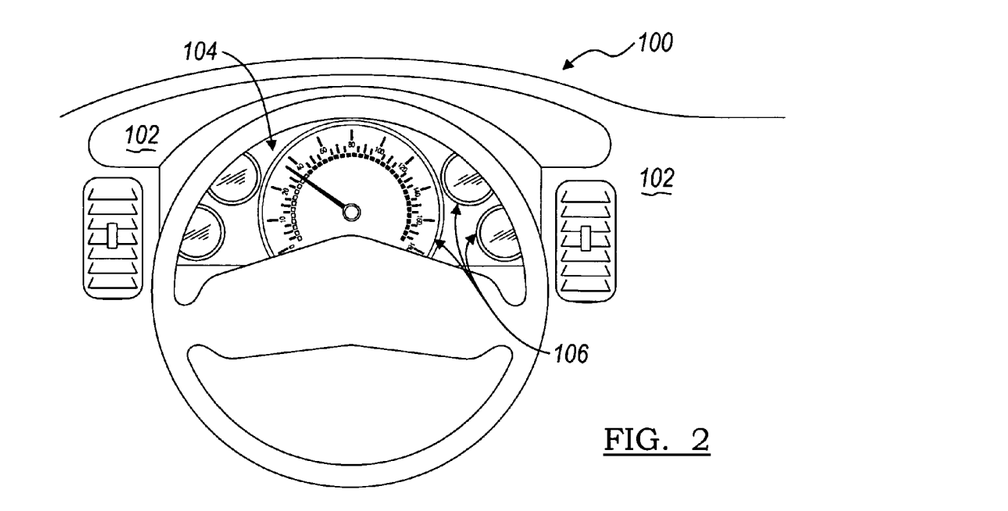
FIG. 2 is a front view of a dash panel housing an instrument cluster having a plurality of gauges constructed in accordance with the present teachings.
Figure 3:
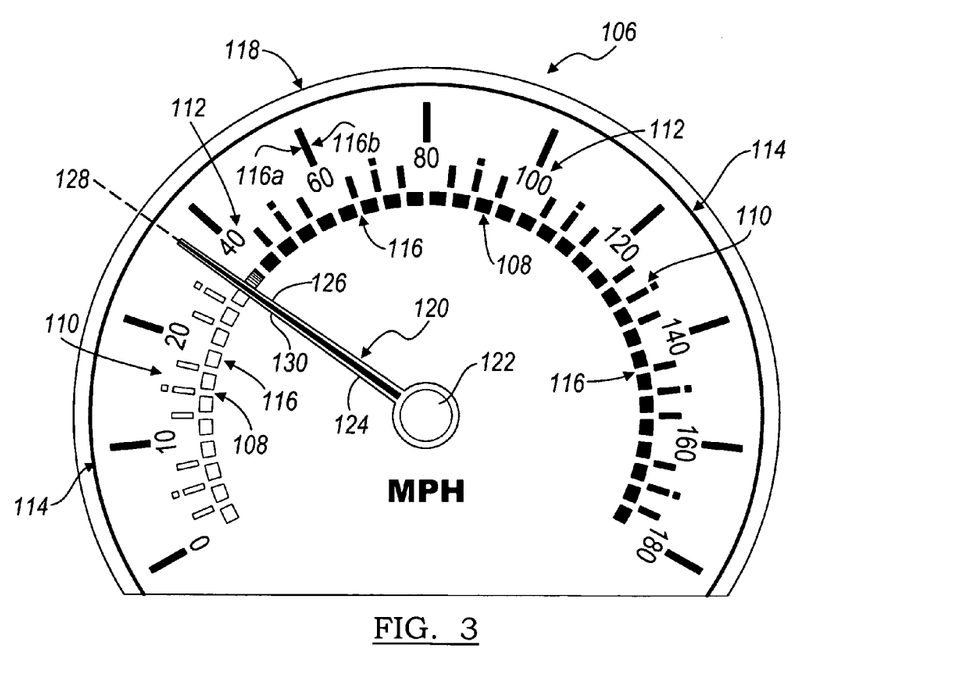
FIG. 3 is a front view of a speedometer constructed in accordance with the present teachings showing a plurality of indicia, a plurality of dimmable segments behind the indicia, and a pointer that moves relative thereto.

With reference to FIGS. 2 and 3, a vehicle 100 includes a dash panel 102 having a display device that may define an instrument cluster 104 constructed in accordance with the various embodiments of the present invention. The instrument cluster 104 includes a plurality of instruments or gauges 106. Each of the gauges 106 may include a plurality of indicia 108, which may include tick marks 110, characters 112, and/or borders 114. In one example, one or more selectively dimmable segments 116 disposed beneath the indicia 108 may emit light having a changing intensity reflexive of a value indicated by the gauge 106. It will be appreciated that changing or adjusting the intensity of the dimmable segments 116 includes at least one of increasing brightness, decreasing brightness, adding color, changing color, removing color and combinations thereof.

In one example and with reference to FIG. 3, one of the gauges 106 may be a speedometer 118. The speedometer 118 may include the tick marks 110 and the characters 112 (i.e., numbers and/or letters) that may indicate a speed scale 30 (e.g., 10, 20, 30 etc.) The speedometer 118 and/or other gauges 106 may include a pointer 120, which is rotatable relative to the tick marks 110 and the characters 112 to thus indicate vehicle speed. The speedometer 118 may also include the border 114, which may demarcate the speedometer 118 from other gauges 106 on the instrument cluster 104. In one example, one or more selectively dimmable segments 116 disposed beneath the indicia 108 may emit light having a changing intensity reflexive of a position of the pointer 120.

The instrument cluster 104 may also include, but is not limited to, a tachometer, a fuel gauge, an oil pressure gauge, a battery voltage gauge and/or an engine temperature gauge. It will be appreciated that the above-listed gauges 106 in the instrument cluster 104 may function and/or be constructed in a similar manner to the speedometer 118 but otherwise indicate their respective vehicle parameters. It will also be appreciated that the pointer 120 may be omitted in each (or all) of the gauges 106.

Figure 8A:
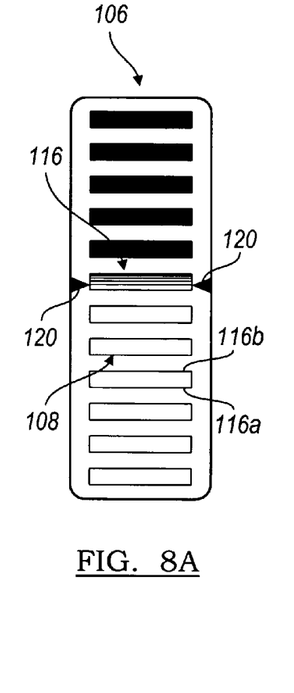
FIGS. 8A-8C are front views of alternative gauges constructed in accordance with the various embodiments of the present invention.

In one example, the pointer 120 may include a hub portion 122 and a needle portion 124. The needle portion 124 may rotate with the hub portion 122 relative to the characters 112 and/or the tick marks 110, as above described. In one example, the pointer 120 may travel along the gauge 106 and indicate a value of a parameter, as shown in FIGS. 8A and 8C. In one example, the gauges 106 of the instrument cluster 104, the needle portion 124 and/or the hub portion 122 may be illuminated by one or more front illumination devices. The front illumination devices may be integral with the dash panel 102. The front illumination devices may front-light the instrument cluster 102.

In another example, portions of each of the gauges 106, the needle portion 124 and/or the hub portion 122 may be illuminated by one or more rear illumination device (other than the dimmable segments 116), which may be located behind the gauges 106. By way of the above example, the rear illumination device may backlight the instrument cluster 104. In one example and with reference to FIG. 3 the dimmable segments 116 are disposed beneath the tick marks 110, the numbers 112 and/or the border 114. As the pointer 120 rotates to indicate a vehicle speed, one or more of the dimmable segments 116, immediately below the pointer 120, increases intensity as the pointer 120 continues over the dimmable segment 116.

In one example, as the pointer 120 crosses (rotates or travels) over the respective indicia 108 and the one or more dimmable segments 116 disposed therebehind, the intensity of the one or more dimmable segments 116 changes. By way of the above example, the intensity of one or more of the dimmable segments 116 increases, as the pointer 120 travels in a direction indicative of an increasing value of the respective vehicle parameters. The intensity of one or more of the dimmable segments 116 may decrease as the pointer 120 travels in a direction indicative of a decreasing value of the respective vehicle parameter.

In one example and with reference to the various Figures, each dimmable segment 116 may have a lower end point 116a and an upper end point 116b. In one example, the lower end point 116a is associated with a first value of a parameter displayed on the gauge 106. By way of the above example, the upper end point 116b is associated with a second value of the parameter displayed on the gauge 106 and the second value is greater than the first value. It will be appreciated that indicia 108 and the dimmable segment 116 may not singularly indicate a value of the parameter on the gauge 106, but the relation of the indicia 108 and the dimmable segment 116 to other indicia 108 and dimmable segments 116 may provide an approximate value of the parameter.

In one example, the intensity of one or more of the dimmable segments 116 may be based on the position of the pointer 120 relative to the lower end point 116a and the upper end point 116b. In one example, the intensity of one or more of the dimmable segments 116 may be based on a position of a leading edge 126 of the pointer 120. In another example and with reference to FIG. 3, the intensity may be based on a position of a center line axis 128 of the pointer 120. In a further example, the intensity may be based on a position of a trailing edge 130 of the pointer 120.

In one example, the intensity of one or more of the dimmable segments 116 increases when the value of the parameter displayed on the gauge 106 is increasing. In one example, the intensity of one or more of the dimmable segments 116 decreases when the value of the parameter displayed on the gauge 106 decreasing. In one example, the intensity of one or more of the dimmable segments 116 is held about constant when the value of the parameter displayed on the gauge 106 is about constant.

In one example, the intensity of one or more of the dimmable segments 116 is controlled to about zero percent intensity (i.e. about dark) or a minimum fraction of a predetermined intensity level when the value of the parameter displayed on the gauge 106 is about equal to the value associated with the lower end point 116a. In one example, the intensity of one or more of the dimmable segments 116 is controlled to about 100 percent intensity (i.e. fully intensity) or a maximum fraction of a predetermined intensity level when the value of the parameter displayed on the gauge 106 is about equal to the value associated with the upper end point 116b. By way of the above example, the predetermined level may be a daytime intensity level, a nighttime intensity level and/or a custom intensity level such that different maximums and/or minimums may be established. The minimum fraction may be zero (0) or some value greater than zero (0). The maximum fraction may be one (1) or some value less than one.

In one example, the intensity of one or more of the dimmable segments 116 is based on the actual value of the parameter displayed on the gauge 106 relative to the values associated with the lower end point 116a and the upper end point 116b and, as such, may be continuously variable. In one example, when the actual value of the parameter is about 30% of the difference between the values associated with the lower end point 116a and the upper end point 116b, the intensity of the one or more dimmable segments is about 30% of the overall intensity. It will be appreciated that the intensity of one or more of the dimmable segments 116 may be at an intermediate fraction of the predetermined intensity level relative to the minimum fraction and maximum fraction of the predetermined intensity level.

Figure 4A:
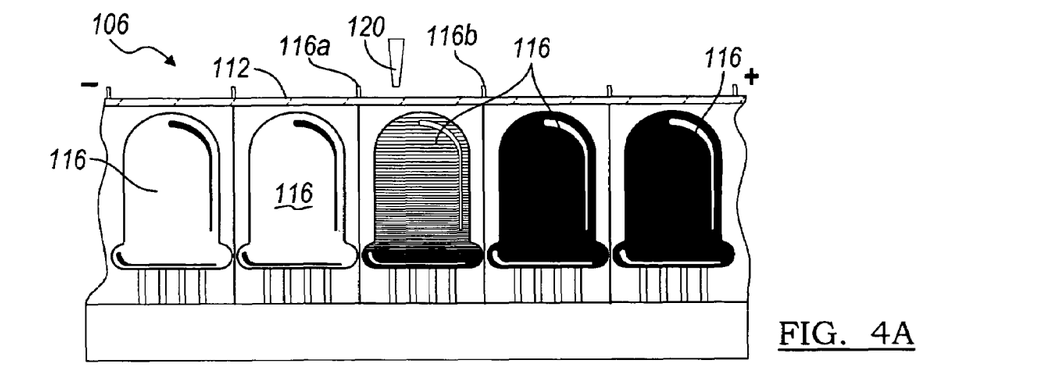
FIGS. 4A-4C are cross-sectional views of exemplary dimmable segments showing a changing intensity of one dimmable segment in response to movement of the pointer in accordance with various embodiments of the present invention.
Figure 4B:
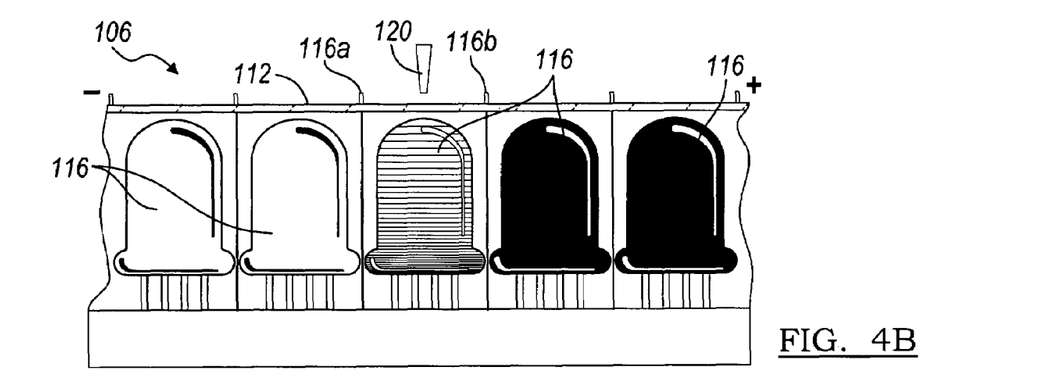
Figure 4C:
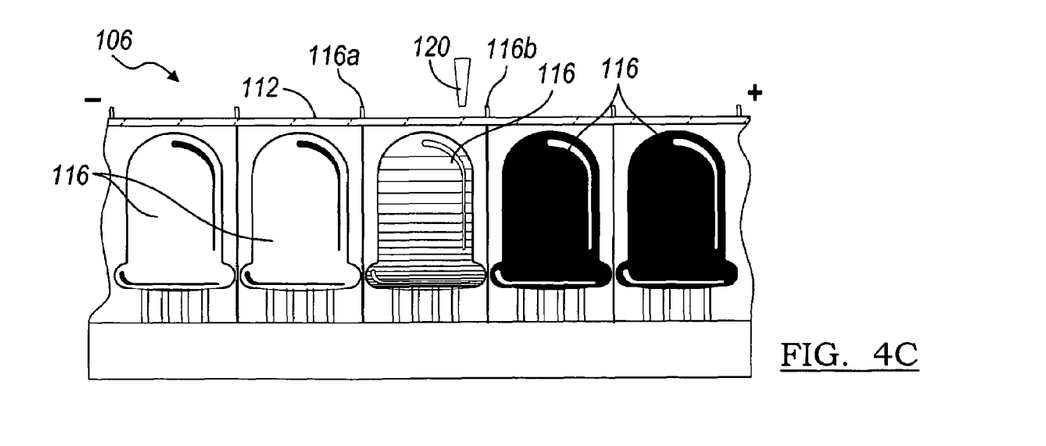

In one example and with reference to FIGS. 4A, 4B and 4C, the intensity of one or more of the dimmable segments 116 above which the pointer 120 is instantly disposed changes reflexively with the position of the pointer 120. As the intensity of the one or more dimmable segments 116 changes, the illumination of the indicia 108 disposed thereabove changes. In one example and with reference to FIG. 4B, the pointer 120 may travel about fifty-percent across the dimmable segment 116 relative to the lower end point 116a and the upper end point 116b. By way of the above example, the dimmable segment 116 may increase its intensity to a level of about fifty-percent or other suitable intermediate fraction thereof. In another example and with reference to FIG. 4C, the pointer 120 may cross about eighty percent of the dimmable segment 116, relative to the lower end point 116a and the upper end point 116b, thus the dimmable segment 116 may emit light at an intensity which is about eighty percent of its overall intensity.

In one example and with reference to FIG. 3, the pointer 120 may be over the one or more dimmable segments 116 that correspond to approximately 35 miles and hour. By way of the above examples, the plurality of indicia 108 and the plurality of the respective dimmable segments 116 positioned below 35 miles per hour (i.e., correspond to values below 35 mph) will be at full intensity or the maximum fraction. The plurality of indicia 108 and the plurality of the respective dimmable segments 116 positioned above 35 miles per hour will be at about zero intensity (i.e., dark) or the minimum fraction. The one or more dimmable segments 116 immediately beneath the pointer 120 (or where the pointer 120 would be if omitted), change intensity as the pointer 120 travels thereover.

Figure 8B:
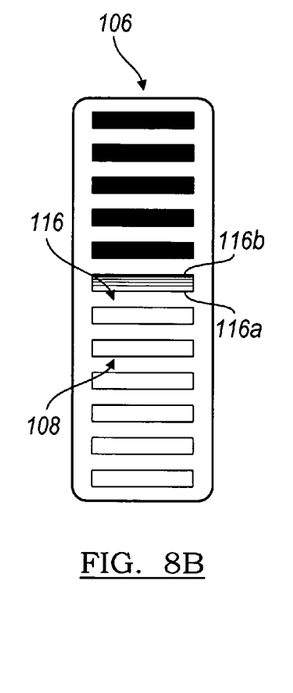
Figure 8C:
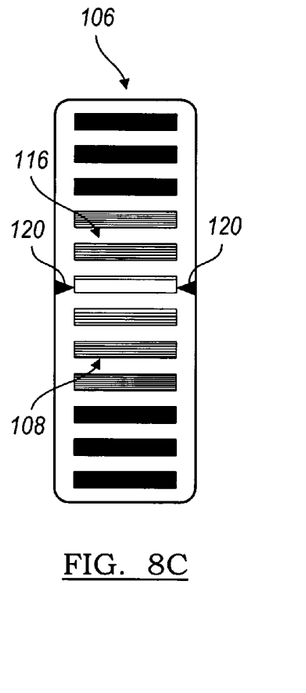

In one example and with reference to FIGS. 8A and 8B, the gauge 106 may be similar to the speedometer 118 but not indicate a vehicle speed. The one or more dimmable segments 116 that are aligned with the pointer 120 (or where the pointer 120 would be), change intensity as the pointer 120 travels thereover. The dimmable segments 116 above the pointer 120 are at zero percent intensity (i.e., dark) or the minimum fraction, while the dimmable segments below the pointer 120 are at one hundred percent intensity (i.e., full intensity) or the maximum fraction. In FIG. 8B, the pointer is omitted but the one or more dimmable segments 116 change intensity as the value of the parameter, which the gauge 106 indicates, is between the values associated with the lower end point 116a and the upper end point 116b of the dimmable segment 116. It will be appreciated that the position of the pointer 120 is a proxy for the actual value of parameter displayed by the gauge 106, thus the dimmable segments 116 are reflexive to the position of the pointer 120 and/or the value it represents.

Figure 5A:
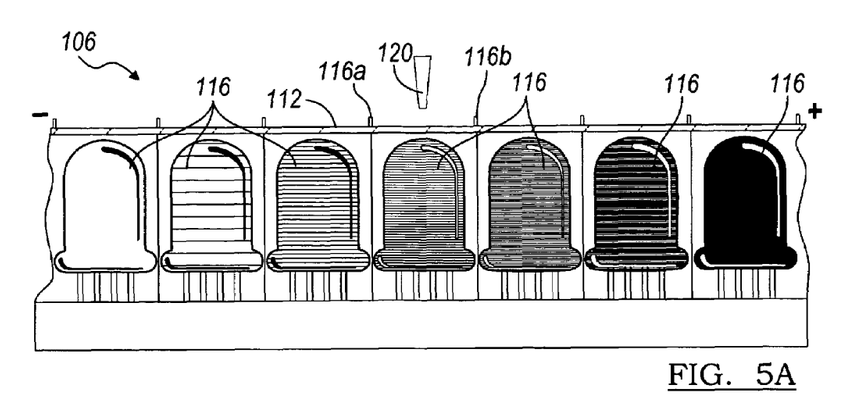
FIGS. 5A and 5B are cross-sectional views of exemplary dimmable segments showing a changing intensity of more than one dimmable segment in response to movement of the pointer in accordance with various embodiments of the present invention.
Figure 5B:
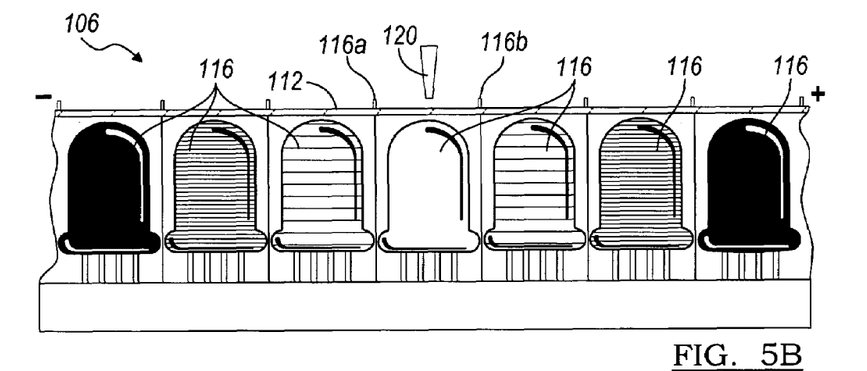

In one example and with reference to FIGS. 5A and 5B, more than one of the dimmable segments 116 may be reflexive to the position of the pointer 120 (i.e., not just the one or more dimmable segments 116 immediately beneath the pointer 120). In one example, five dimmable segments 116 may change their intensity reflexive to the position of the pointer 120. More specifically, and with reference to FIG. 5A, as the pointer 120 travels along the gauge 106, the dimmable segments 116 immediately behind the pointer 120 (i.e., left, as illustrated) may be at a higher intensity while the dimmable segments immediately in front of the pointer 120 (i.e., right, as illustrated) may be at a lower intensity.

In one example, the one or more dimmable segments 116, which is two positions back from the pointer 120, may be at ninety percent intensity or other suitable intermediate fraction, while the one or more dimmable segments 116, which is one position back, may be at seventy percent intensity. The one or more dimmable segments 116 immediately beneath the pointer 120 may be at fifty percent intensity. The one or more dimmable segments 116 immediately in front of the pointer 120 may be at thirty percent intensity or other suitable intermediate fraction while the one or more dimmable segments 116 two positions in front of the pointer 120, may be at ten-percent intensity or other suitable intermediate fraction.

In one example and with reference to FIG. 5B, the one or more dimmable segments 116, which is three positions back from the pointer 120, may be at zero percent intensity (i.e., dark) or the minimum fraction. The one or more dimmable segments 116, which are two positions back, may be at thirty percent intensity. The one or more dimmable segments 116, which are one position back, may be at seventy percent intensity or other suitable intermediate fraction. The one or more dimmable segments 116 immediately beneath the pointer 120 may be at one hundred percent intensity. The one or more dimmable segments 116 immediately in front of the pointer 120 may be at seventy percent intensity. The one or more dimmable segments 116 two positions in front of the pointer 120 may be at thirty percent intensity. The one or more dimmable segments 116 three positions in front of the pointer 120 may be at zero percent intensity (i.e. dark) or the minimum fraction.

In one example and with reference to FIGS. 7C and 8C, the one or more dimmable segments 116 immediately below the pointer 120 (or a position equivalent to a value to which the pointer would otherwise point) may be at one hundred percent intensity, while immediately adjacent positions may be at a less intensity. The intensity may become less as the distance from the pointer 120 increases such that dimmable segments 116 spaced a predetermined distance from the pointer 120 (e.g., 3 positions) are at zero percent intensity (i.e., dark). In FIGS. 7C and 8C, as in other examples, the pointer 120 may be omitted.

Figure 5C:
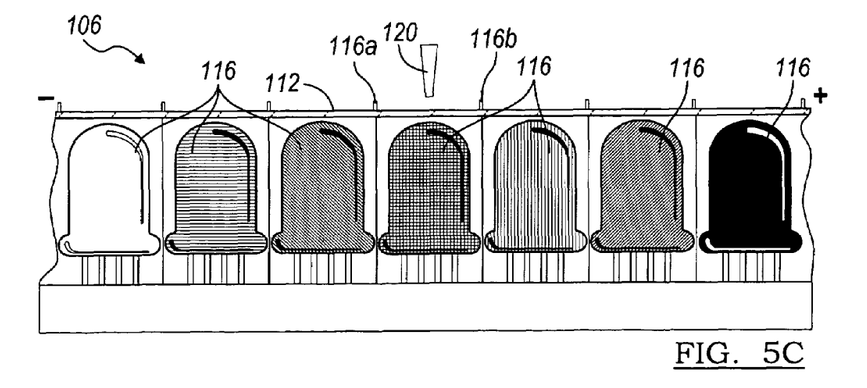
FIG. 5C is a cross-sectional view of exemplary dimmable segments showing a changing intensity that includes a change in color of the dimmable segments in response to movement of the pointer in accordance with various embodiments of the present invention.
Figure 7A:
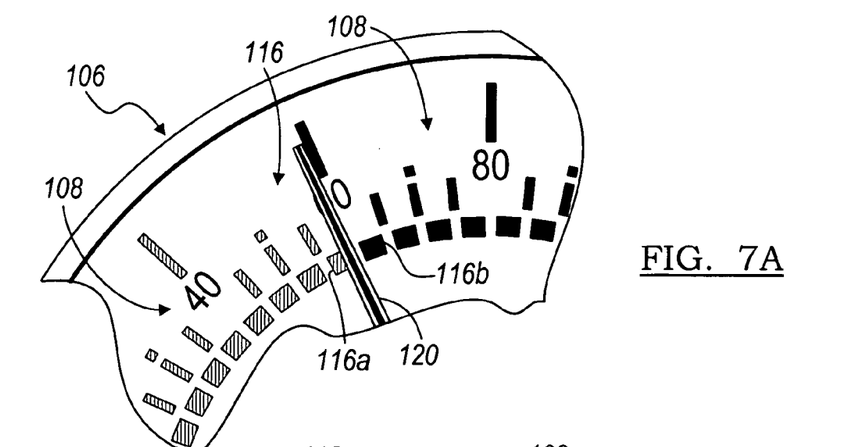
FIGS. 7A-7C are partial front views of the speedometer of FIG. 3 showing various changes in intensity of the dimmable segments.
Figure 7B:
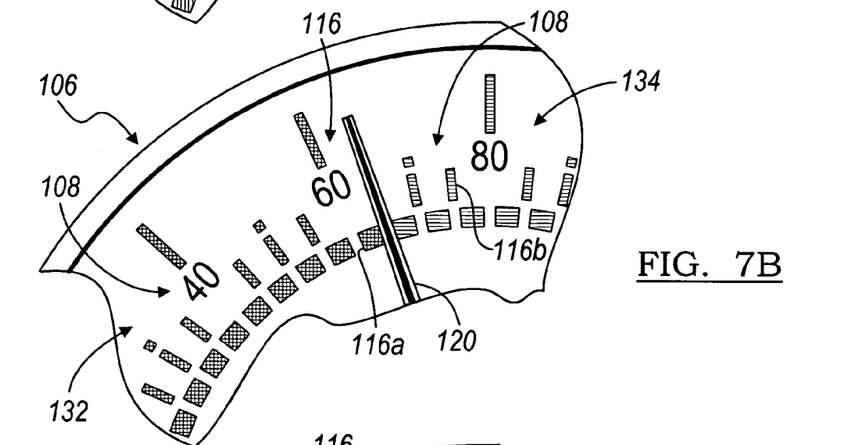
Figure 7C:
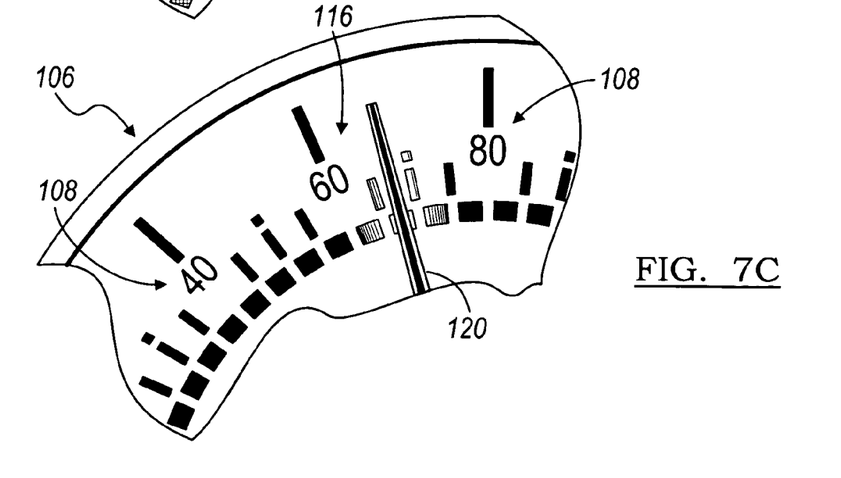

In one example and with reference to FIGS. 7A and 7B, the dimmable segments 116 that are otherwise lit, per the above examples, may be in one color while the dimmable segments 116 that are not lit, thus not illuminated (i.e., dark), may be in a second color or remain not lit. In one example and with reference to FIG. 7B, the dimmable segments 116 disposed at positions behind the pointer 120 (i.e., representing values less than the value indicated by the pointer 120) may be yellow, which is generally indicated by reference numeral 132. The dimmable segments 116 above the pointer 120 may be illuminated and be blue, which is generally indicated by reference number 134. As the pointer 120 moves, the respective dimmable segments 116 may change between yellow and blue or other suitable color combinations. In a further example and with reference to FIG. 5C, the dimmable segment immediately beneath the pointer 120 may be one color while adjacent segments 116 may be different colors. As the pointer 120, moves farther away from respective dimmable segments 116 the color and/or brightness may change.

Figure 6:
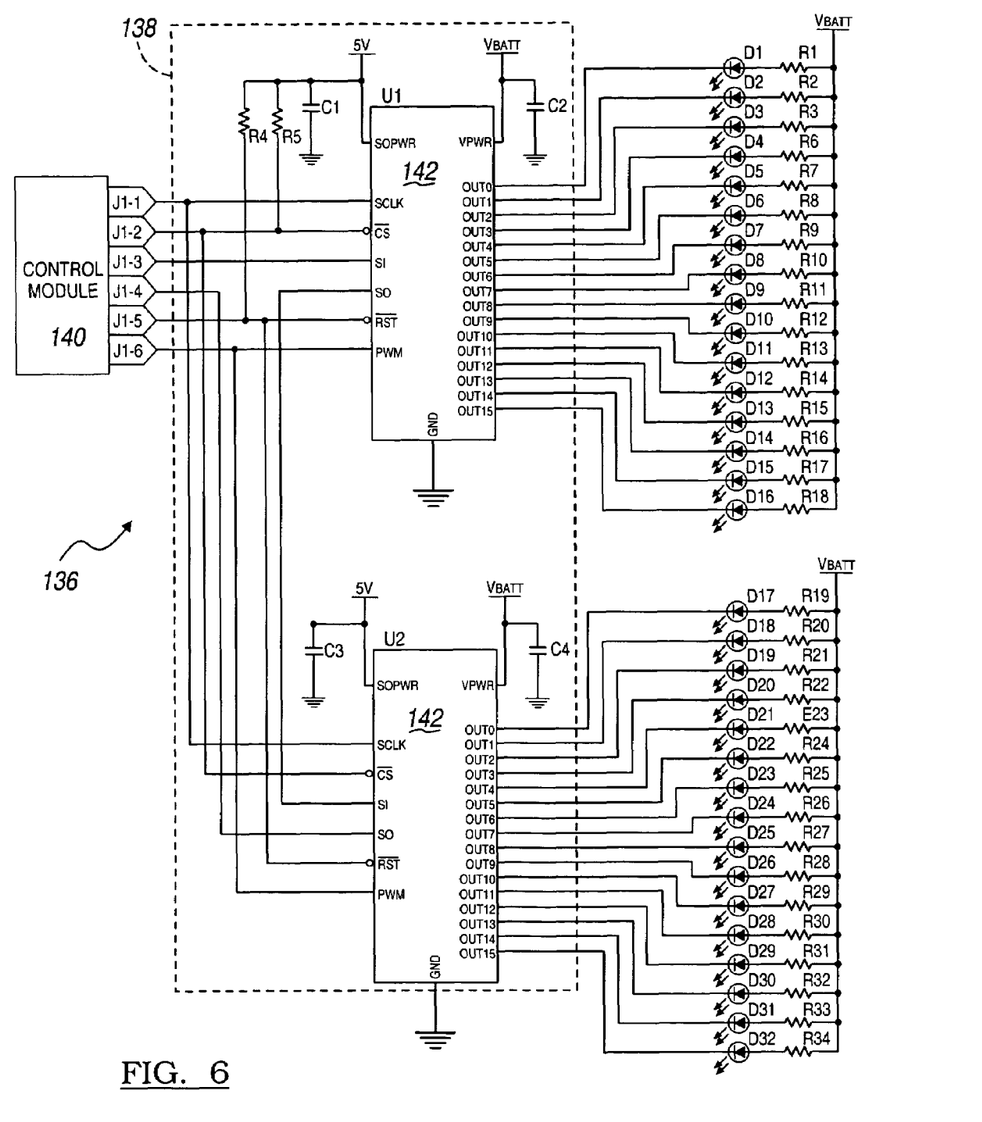
FIG. 6 is an exemplary schematic of a portion of the dimmable segments in accordance with various embodiments of the present invention.

In one example and with reference to FIG. 6, an exemplary dimmable segment control system is shown and generally indicated by reference numeral 136. The control system 136 includes a segment control module 138 that may be attached to a control module 140. The control module 140, for example, may be an engine computer in the vehicle 100. The segment control module 138 may contain one or more integrated controllers 142 or other suitable mechanical, electrical and/or electromechanical components. The integrated controllers 142 may be connected to a plurality of dimmable segments 116. Each of the dimmable segments 116 may be an LED an incandescent bulb and/or other suitable illumination device. The intensity of the dimmable segments 116 may varied by a pulse wave modulated signal from the control module 140. It will be appreciated that the amount of dimmable segments 116 and the amount of integrated controllers 142 may be scalable such that there may be numerous LEDs within an instrument cluster 104 and/or the single gauge 106 and numerous integrated controllers 142 or other suitable components. Moreover, the dimmable segments 116 may be used in a single or multiple gauges 106 on the instrument cluster 104.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A display device having a plurality of indicia indicative of a vehicle parameter, the display device comprising:

a plurality of dimmable segments, each of said dimmable segments having a lower end point location associated with a first value of the vehicle parameter and an upper end point location associated with a second value of the vehicle parameter, each of said dimmable segments having an independently adjustable intensity and adapted to illuminate at least a portion of the indicia;

a control module that receives a signal indicative of an actual value of the vehicle parameter, said control module adjusting said intensity of at least one of said dimmable segments based on said signal, wherein said intensity is at a first intensity when said actual value of the vehicle parameter is about equal to said first value and said intensity is at a second intensity when said actual value of the vehicle parameter is about equal to said second value; and a pointer moveable relative to the indicia to indicate said actual value of the vehicle parameter, when said pointer is disposed at said lower end point location, said intensity is equal to said first intensity, when said pointer is between said lower end point location and said upper end point location, said intensity of said dimmable segment increases as said pointer travels above said dimmable segment toward said upper end point location and away from said lower end point location, when said pointer is between said lower end point location and said upper end point location, said intensity of said dimmable segment decreases as said pointer travels above said dimmable segment toward said lower end point location and away from said upper end point location, when said pointer is disposed at said upper end point location, said intensity is equal to said second intensity, and when said pointer is not disposed above said dimmable segment, said intensity of said dimmable segment remains constant.

2. The display device of claim 1, wherein said intensity of said dimmable segment is constant and appears dark when said actual value is about constant and said pointer is not disposed above said dimmable segment.

3. The display device of claim 1, wherein said increase in said intensity includes at least one of increasing brightness, adding color, changing color, removing color and combinations thereof and said decrease in said intensity includes at least one of decreasing brightness, adding color, changing color, removing color and combinations thereof.

4. The display device of claim 1, wherein said first intensity is a minimum fraction of a predetermined intensity level and said dimmable segment is illuminated at said first intensity when said pointer is over said lower end point location, said second intensity is a maximum fraction of said predetermined intensity level and said dimmable segment is illuminated at said second intensity when said pointer is over said upper end point location, said dimmable segment is illuminated at an intensity that is an intermediate fraction of said predetermined intensity level when said pointer is disposed in a position indicative of said actual value of the vehicle parameter being between said first value and said second value and said pointer is disposed between said upper and lower end portion locations on said dimmable segment.

5. The display device of claim 4, wherein said predetermined intensity level is one of a daytime intensity level, a nighttime intensity level, and a custom intensity level.

6. The display device of claim 4, wherein said minimum fraction is zero (0) and said dimmable segment appears dark.

7. The display device of claim 4, wherein said minimum fraction is greater than zero (0).

8. The display device of claim 4, wherein said maximum fraction is one (1).

9. The display device of claim 4, wherein said intensity of said dimmable segment is continuously variable between said minimum fraction and said maximum fraction while said pointer is above said dimmable segment and disposed between said upper and said lower end point locations.

10. The display device of claim 2, wherein a color of said dimmable segment is identical to a color of said plurality of dimmable segments.

11. A method of controlling a display device, the method comprising:

providing a plurality of independently adjustable dimmable segments;

associating a lower end point location of a dimmable segment from said plurality of independently adjustable dimmable segments with a first value;

associating an upper end point of said dimmable segment with a second value;

determining an actual value of a vehicle parameter to be displayed on the display device;

positioning a pointer over said dimmable segment to indicate said actual value of said parameter;

increasing an intensity of said dimmable segment over which said pointer is positioned when said actual value increases and said pointer moves toward said upper end point location; and decreasing said intensity of said dimmable segment over which said pointer is positioned when said actual value decreases and said pointer moves toward said lower end point location.

12. The method of claim 11 further comprising: holding said intensity constant when said actual value is constant and said pointer is between said upper and said lower end point locations on said dimmable segment; and holding said intensity constant when said actual value is not constant and said pointer is not between said upper and said lower end point locations on said dimmable segment.

13. The method of claim 11, wherein said increasing of said intensity includes at least one of increasing brightness, adding color, changing color, removing color and combinations thereof and said decreasing of said intensity includes at least one of decreasing brightness, adding color, changing color, removing color and combinations thereof.

14. The method of claim 11 further comprising:

decreasing said intensity of said dimmable segment to about a minimum fraction of a predetermined intensity level when said position of said pointer is over said lower end point location of said dimmable segment, increasing said intensity of said dimmable segment to about a maximum fraction of said predetermined intensity level when said position of said pointer is over said upper end point location of said dimmable segment, decreasing said intensity of said dimmable segment to about an intermediate fraction that is between said minimum fraction and said maximum fraction, when said pointer moves to said intermediate location in a direction toward said lower end point location and away from said upper end point location;

increasing said intensity of said dimmable segment to about said intermediate fraction that is between said minimum fraction and said maximum fraction, when said pointer moves to said intermediate location in a direction toward said upper end point location and away from said lower end point location.

15. The method of claim 14, wherein said predetermined intensity level is one of a daytime intensity level, a nighttime intensity level, and a custom intensity level, wherein said minimum fraction is zero (0) and wherein said maximum fraction is one (1).

16. The display device of claim 11, wherein a color of said dimmable segment is identical to a color of said plurality of independently adjustable dimmable segments.

17. A display device having indicia indicative of a vehicle parameter, the display device comprising:
- at least a first dimmable segment, a second dimmable segment and a third dimmable segment, each of said dimmable segments having a lower end point location associated with a first value of the vehicle parameter and an upper end point location associated with a second value of the vehicle parameter, each of said dimmable segments having an independently adjustable intensity and adapted to illuminate at least a portion of the indicia;
- a control module that receives a signal indicative of an actual value of the vehicle parameter, said actual value being between said first value and said second value, said control module increases an intensity of said second dimmable segment based on said signal when said actual value of the vehicle parameter is increasing in value and said pointer is disposed between said upper and said lower end point locations of said second dimmable segment, said control module adjusts said intensity of said first dimmable segment to a maximum fraction of a predetermined intensity level, said control module adjusts said intensity of said third dimmable segment so said third dimmable segment is dark.

18. The display device of claim 17, wherein said predetermined intensity level is one of a daytime intensity level, a nighttime intensity level and a custom intensity level.

19. The display device of claim 17, wherein said intensity of said second dimmable segment is continuously variable between being dark and said maximum fraction of said predetermined intensity level when said pointer is between said upper and lower end point locations.

20. The display device of claim 17, wherein a color of said second dimmable segment is identical to a color of said first dimmable segment.

21. The display device of claim 19, wherein said color of said second dimmable segment and said color of said first dimmable segment changes as said actual value of the vehicle parameter changes.

\* \* \* \* \*